Nov. 25, 1952     S. M. ZOLLERS     2,619,601
RADIOACTIVITY SURVEY APPARATUS
Filed Oct. 4, 1950
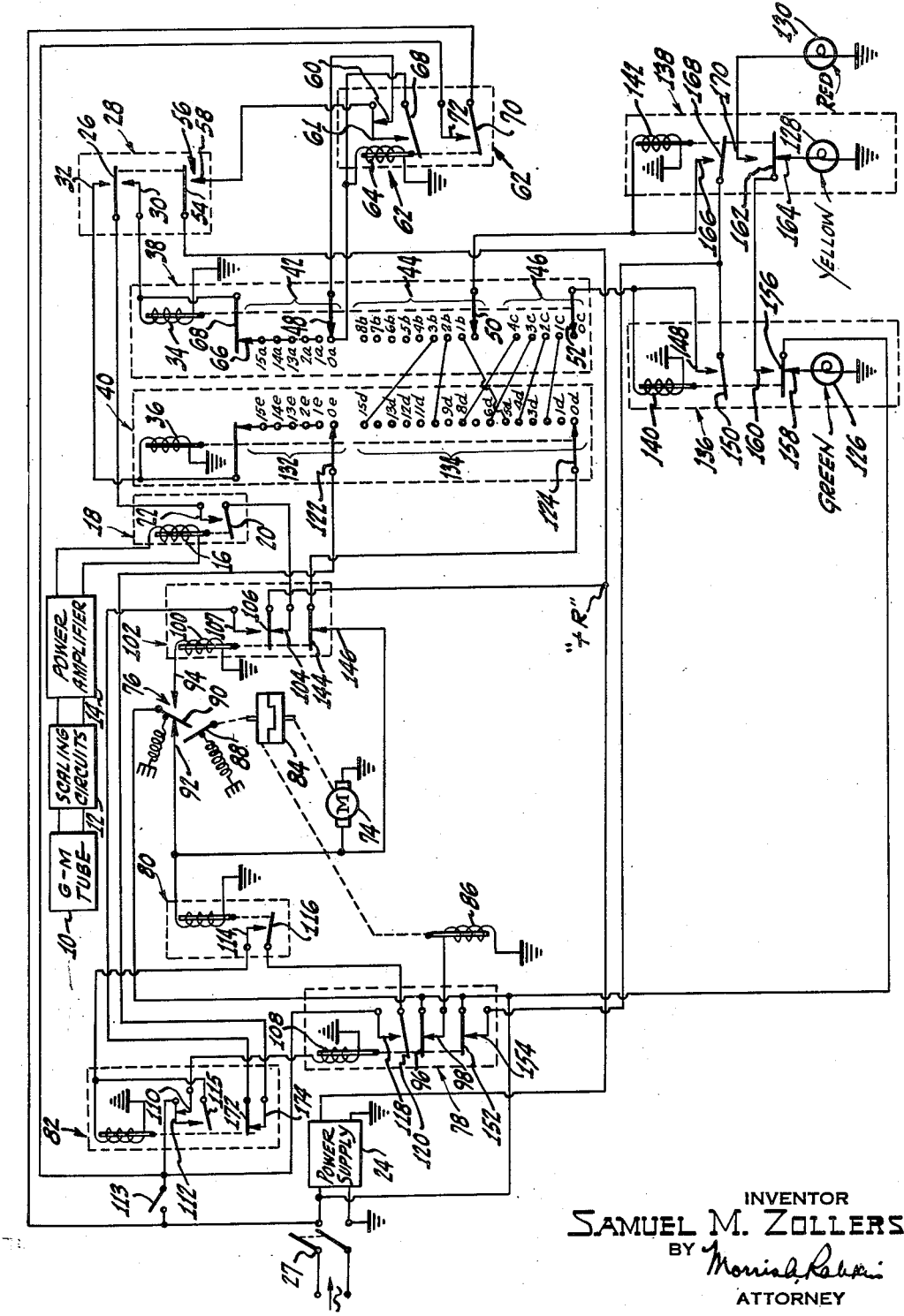
INVENTOR
SAMUEL M. ZOLLERS
BY
ATTORNEY Patented Nov. 25, 1952

2,619,601

UNITED STATES PATENT OFFICE 2,619,601

RADIOACTIVITY SURVEY APPARATUS

Samuel M. Zollers, Haddonfield, N. J., assignor, by mesne assignments, to the United States of America as represented by the United States Atomic Energy Commission Application October 4, 1950, Serial No. 188,337

7 Claims. (Cl. 250—83.6)

This invention relates to improvements in radioactivity survey apparatus, and particularly to an improved apparatus for measuring and indicating the relative radioactivity of a specific radioactive source. While not limited thereto, the invention finds particular application in and will be described with special reference to a system for indicating the relative radioactive contamination of a person or subject after exposure to radioactive materials.

In the handling of radioactive material, accidental contact with the material frequently occurs without the knowledge of the subject handling the material. Therefore, it is customary to make a periodic survey of personnel handling such material to detect dangerous concentrations before any personal injury occurs.

Various systems have been devised for the purpose of detecting the presence and relative concentration of radioactive materials. The information obtained with such systems usually is in terms of "counts," produced by radiation detecting devices, such as Geiger-Muller tubes and the like. Since the radiation detectors commonly used also respond to ambient or "background" radiation, such as from cosmic rays or rays generated by radioactive operations in the vicinity, the count obtained when a subject is examined actually is the sum of the counts from the subject being examined and from the background. While shielding of the detector will serve to reduce the background count to some extent, as a practical matter it is difficult if not impossible to completely eliminate these extraneous counts. Accordingly, evaluation of the information obtained during a subject survey requires knowledge of the background count and total count.

It is a general object of the present invention to provide an improved apparatus for making radioactivity surveys in the presence of background radiation.

A more specific object of the invention is to provide a radiation survey apparatus in which background radiation information is automatically accounted for in determining relative subject contamination.

A further object of the invention is to provide an improved radioactive contamination monitor which will give an arbitrary and readily understood indication of the relative contamination of a subject.

In accordance with the invention, the foregoing and other related objects and advantages are attained by embodying in a radioactivity survey apparatus a system of comparison relay-actuated switches in which background radiation information is stored for comparison with information obtained by surveying a subject in the presence of background radiation.

A more complete understanding of the invention can be had from the following description of an illustrative embodiment thereof, when considered in connection with the accompanying drawing, the single figure of which is a partially schematic and partially block diagram of an apparatus embodying the principles of the invention.

Referring to the drawing, the apparatus shown comprises a system for determining the number of radioactive emanations coming from a subject under survey during a predetermined time interval. In brief, operation of the apparatus includes initial calibration operation during which information is obtained and stored as to the ambient or background radioactivity in the area of the apparatus, followed by a subject survey period during which the contamination of the subject being surveyed is computed and indicated in terms of its relation to the previously obtained background information.

The apparatus shown has two principal sections. The first is the detecting and counting section, wherein radioactive emanations are detected and converted to a form suitable for use in the selecting and indicating section.

The detecting and counting section of the system is conventional, and has been shown in block diagram form. A Geiger-Muller tube 10, or equivalent, is provided for generating an electrical pulse each time a ray passes through the tube 10. The tube 10 is connected to a scaling circuit 12, such as a set of binary counter networks or the like, to scale down the output pulses of the tube 10. For example, the scaling circuit 12 may produce one output pulse for each eight pulses generated in the tube 10. The scaling circuit 12 is connected to supply pulses through a power amplifier 14 to the operating winding 16 of a relay 18. This relay 18 has a movable contact 20 which engages a fixed contact 22 each time a pulse is delivered from the scaling circuit 12. As will be explained shortly, closing of the relay contacts 20, 22 causes a voltage pulse to be delivered to the selecting and indicating sections of the apparatus.

For simplicity, a single power supply system 24 is shown for converting alternating voltages to unidirectional voltage for the detector circuits 10—14 and for certain of the relays referred to hereinafter. The power supply 24 is to be energized by alternating voltage from a suitable source (not shown) through a main switch 27.

While the detecting and counting circuits 10—14 will operate continuously once the main power switch 27 is closed, it will be understood that the relative concentration of radioactive material in an area can be determined by a relatively brief survey of the area. That is, the area of interest can be surveyed for a predetermined time, and the relative radioactivity thereof expressed in terms of "counts per second," "counts per minute," or the like.

As was previously stated, when a radioactivity survey is made of a specific source, such as a possibly contaminated area on a human body, an allowance must be made for background radiation in the vicinity of the apparatus.

In the remaining portions of the apparatus shown, provision is made for obtaining background radiation information during a preselected time interval, storing this information, surveying the subject during an equal time interval, and automatically comparing the subject and background information.

Considering, first, the background information storage system, it will be seen that the fixed contact 22 of the counter output relay 18 is connected to the movable contact 26 of a single pole double throw switch 28. This switch 28, designated the "background-subject" switch, has a pair of fixed contacts 30, 32 which are connected to the operating windings 34, 36 of a pair of "stepping" relays 38, 40, designated the "background count" and "subject count" relays, respectively. The relays 38, 40 are of the type wherein movable contacts are adapted to be moved consecutively over a plurality of fixed contacts, step by step, moving one step forward in response to each impulse of current through the relay winding. Since such relays are well known in the art, a further detailed description thereof is believed to be unnecessary.

The background count relay 38 is provided with three separate banks or decks of contacts 42, 44, 46 each deck having its individual movable contact 48, 50, 52. All of the contacts 48, 50, 52 are mechanically connected to move forward in synchronism in response to energization of the relay winding 34. For simplicity, only enough of the contacts of each deck are shown as is necessary to an understanding of the invention.

Assuming, for the moment, that the movable contact 26 of the background-subject switch 28 is in the "background" position, touching the lower contact 30, and that the movable contact 20 of the counter output relay 18 is connected to the voltage source +R, then each time a pulse is received by the counter output relay 18, each of the movable contacts 48, 50, 52 will be advanced one step on its associated deck of fixed contacts. If the movable contacts 48, 50, 52 all were in the "zero" position to begin with, then the final position of these contacts would be indicative of the number of pulses received by the output relay 18.

In order to insure that the movable contacts 48, 50, 52 all will be in the zero or "home" position prior to taking a background count, the movable contact 54 of a switch 56 is connected to be moved downwardly into contact with a fixed contact 58 when the background-subject switch 28 is moved to the background position. This operation completes a circuit from the voltage source 24 through the switch contacts 54, 58, through make-before-break contacts 60, 61 on a relay 62, to the movable (upper deck) contact 48 of the background relay 38. All of the fixed contacts $0_a$–$15_a$ of the upper deck 42, expect the first or "$0_a$" position contact, are connected to an auxiliary fixed contact 66 on the background relay 38. This fixed contact 66 normally engages a movable contact 68. Therefore, if the movable upper deck contact 48 is in any position other than the zero position when the background homing switch 56 is closed, voltage will be applied to the background relay winding 34. All of the background relay contacts 48, 50, 52 will step forward one position, and the auxiliary contacts 66, 68 will open, breaking the circuit to the winding 34. The auxiliary contacts 66, 68 then will close again, and the action just described will be repeated until all of the movable contacts 48, 50, 52 reach the zero position. When this occurs, voltage will be applied from the "$0_a$" contact on the upper contact deck 42 to the winding 64 of the homing control relay 62. When the homing control relay 62 is energized, a movable contact 68 will move up to open the circuit through the make-before-break contacts 60, 61, and to complete a holding circuit to the winding 64 of the homing control relay. Thus, once the background relay 38 is in the home position, homing action cannot take place without first deenergizing the homing control relay 64 by opening the homing switch 56.

The homing control relay 62 also is provided with a set of contacts 70, 72 which close when the relay 62 is energized. These contacts close a circuit which provides for time-controlled background counting, as will now be described.

Timing of counting operations is provided by a timer motor 74 which operates under the control of three relays 78, 80, 82, a clutch mechanism 84, and a snap-switch 76. The clutch 84 is controlled by a solenoid 86, and operates (when the solenoid 86 is energized) to couple the motor 74 to an arm 88 for actuating the switch 76. That is, with the solenoid 86 and the motor 74 energized, the arm 88 gradually will move in a clockwise direction until it engages the movable contact 90 of the switch 76. The movable contact 90 then will snap out of engagement with the contact 92 and into engagement with the other fixed contact 94. When the main power switch 27 is closed, to turn the apparatus on, voltage will be applied to a movable contact 96 on the first timer control relay 78. As long as the relay 78 is deenergized, voltage will be applied to energize the solenoid 86 through the movable contact 96 and a fixed contact 98 on the relay 78.

At the same time, the motor 74 will receive energizing voltage through the contacts 90, 92 of the timer switch 76. The timer motor will begin operating and eventually will actuate the switch 76. This will open the motor circuit, and will supply operating voltage to the winding 100 of a relay 102 through the contacts 90, 94. However, even though the motor circuit is open, the timer switch 76 will be held in "actuated" position, energizing the winding 100, as long as the solenoid 86 keeps the clutch 84 engaged.

It will be noted that the movable contact 20 of the counter output relay 18 is connected to a fixed contact 104 on the relay 102. As long as the relay 102 is deenergized, the contact 104 will be engaged by a movable contact 106 which is connected to the voltage source 24. However, the circuit from the voltage source 24 to the movable contact 20 of the counter output relay 18 will be open whenever the counter output control relay 102 is energized.

To start a counting interval, the solenoid 86 must be deenergized to release the clutch 84 and allow the timer switch 76 to return to starting position. In general, the circuit for the solenoid 86 is deenergized by energizing the first timer control relay 78. This relay 78 can be energized by completing a circuit from the winding 108 thereof through make-before-break contacts 110, 112 on the third timer control relay 82 to the main power switch 27 either through a switch 113 or through contacts 70, 72 on the background homing control relay 62. In background counting, for example, the homing relay 62 is energized as previously described, closing the contacts 70, 72. This energizes the timer control relay 78, as just described, deenergizing the solenoid 86. In turn, the timer switch will snap over to close its contacts 90, 92. This will energize both the timer motor 74 and the second timer control relay 80.

When the second timer control relay 80 is energized, a circuit will be completed through contacts 114, 116 thereof and through contacts 118, 120 of previously energized relay 78 for energizing the third timer control relay 82. When this relay 82 is energized, make-before-break contacts 110, 112 thereof open, by action of movable contact 115, deenergizing the first timer control relay 78 and, hence, energizing the solenoid 86. At the same time, a holding circuit for this relay 82 will be completed through contacts 112, 115 thereof. Since the timer motor 74 also will be energized at this time, a timing cycle will begin during which background radiation information can be received and stored at the background counting relay 38. The duration of the counting interval will be a function of the operating speed of the motor 74 and the distance of travel of the actuating arm 88. During this interval, "counts" actuating the counter output relay 18 will be passed on to the background relay 38. The timing interval will end when the timer switch 76 operates to deenergize the motor 74 and energize the relay 102. The position of the various movable contacts 48, 50, 52 on the background counting relay 38 now will represent the amount of radiation detected by the Geiger-Muller tube 10 during the background counting interval.

With background count information stored as just described, the apparatus now will be ready for subject survey.

As a first step, the background-subject switch 28 is changed to open the circuit through contacts 26, 30 and close the circuit through contacts 26, 32. This operation will deenergize the homing control relay 62, thereby opening the contacts 70, 72 thereof and removing the by-pass around the switch 113. In turn, the third timer control relay 82 will be deenergized. However, since the solenoid 86 is not deenergized, the timer switch 76 will be held in actuated position.

When a subject is in position to be surveyed, the switch 113 is closed to start "subject counting." For example, the switch 113 may be automatically actuated when the subject is in position in front of the detector 10.

When the switch 113 closes, a timed counting sequence occurs as was already described in connection with the closing of contacts 70, 72 on the background homing relay 62. This time, of course, operation of the counter output relay 18 applies pulses to the operating winding 36 of the subject relay 40, causing the movable contacts 122, 124 thereof to move forward one step for each pulse received. As will be explained hereinafter, the contacts 122, 124 will be in the zero position at the beginning of each subject counting interval, so that the position of the contacts 122, 124 at the end of such interval always will represent accurately the total radiation intercepted by the detector 10 during that interval.

As was previously stated, the present invention provides means to determine the radioactivity of a subject relative to background radiation in the area. That is, counts obtained during a "subject counting" interval will be the sum of the background radiation and radiation coming from the subject. Therefore, this subject count must be compared with the background count to determine the actual amount of radiation coming from the subject.

In the illustrative embodiment of the invention shown in the drawing, three indicators are provided and arranged to indicate three possible conditions of a subject. One of the indicators 126 may comprise a green light, a second indicator 128 may comprise a yellow light, and a third indicator 130 may comprise a red light. It is contemplated that the appearance of a green light at the end of a subject counting interval will indicate that the subject is not contaminated, that the appearance of a yellow light will indicate probable contamination, and that the appearance of a red light will indicate definite contamination. Each of these categories will be representative of some predetermined ratio between background plus subject count and background count.

It will, of course, be understood that different types of radioactive material will have different potentially harmful effects, so that if the contamination of the subject is, say, three times as great as the normal background count in the area, it might be a dangerous condition for one radioactive material although not for another. In the present example, it is assumed that a contamination equal to twice the background count is sufficiently dangerous to warrant a "probably contaminated" indication, and that a contamination five times background count is sufficiently dangerous to warrant an indication of "definitely contaminated." However, it will be seen that the subject relay 40 has two contact decks 132, 134. The upper deck 132 is provided to insure homing action, as will be described hereinafter. The lower deck 134 cooperates with the middle and lower decks 44, 46 of the background counting relay to control actuation of the indicators 126—130.

The indicators 126—130 are under the immediate control of a pair of relays 136, 138. The winding 140 of one relay 136 is connected to the movable contact 52 on the lower deck 46 of the background counting relay 38. The winding 142 of the other indicator control relay 138 is connected to the movable contact 50 on the middle deck 44 of the background relay 38. One or both of the relays 136, 138 may be energized, depending on the relative positions of the movable contacts 50, 52 and 124 on the stepping relays 38, 40.

It will be noted that connections are made between certain of the fixed contacts on the middle and lower decks of the background relay 38 and the lower deck 134 of the subject relay 40. Specifically, in the present example, connections are made from contacts $1_c$, $2_c$, $3_c$, $4_c$ on the lower deck 46 of the background relay 38 to contacts $2_d$, $4_d$, $6_d$, $8_d$ on the lower deck 134 of the subject relay 40. This represents a ratio of two to one between the contact numbers. Connections also are made from contacts $1_b$, $2_b$, 3b on the middle deck 44 of the background relay 38 to contacts 5d, 10d and 15d on the lower deck of the subject relay 40. This provides a ratio of five to one between the contact members.

The movable contact 124 of the subject lower deck 134 is connected to a movable contact 144 on the counter control relay 102. A cooperating fixed contact 146 is connected to the fixed contact 92 on the timer switch 76. Therefore, whenever the timer switch 76 is in position to complete a circuit through the contacts 90, 92 thereof, the subject relay lower deck contact 124 will receive voltage from the switch 27. As this contact 124 is moved forward in sequence over the associated fixed contacts 1d, 2d, etc., voltage from the switch 27 will appear, in turn, at each of the background lower deck contacts 1c, 2c, etc. If the subject contact 124 moves far enough, voltage also will appear, in turn, at each of the background middle deck contacts 1b, 1c, etc.

Prior to subject survey, the indicator control relays will be deenergized, and the "green" indicator 126 will be energized through the switch 27 and through a pair of contacts 156, 158 on the relay 136.

Assume that the background count in a given case was equal to "three," leaving the movable contacts 50 and 52 of the background relay 38 on associated contacts 3b and 3c, respectively. Assume also that a given subject, when surveyed, produced a count of "seven," thereby moving the movable contact 124 to contact 7d on the associated deck 134. During subject survey period, the first effect on the indicator system will occur when the movable contact 124 engages the fixed contact 6d. At this time, voltage will be applied through the connecting link to contact 3c on the background lower deck 46, thereby energizing the relay 136. As soon as the relay 136 is energized, a holding circuit will be established for the relay 136 from the voltage source through a pair of contacts 152, 154 on the first timer control relay 78 and through a pair of contacts 148, 150. Therefore, although the movable contact 124 will continue on to its next fixed contact 7d, the relay 136 will remain energized. Energization of the relay 136 also will open the circuit through the contacts 156, 158 and will complete a circuit to the "yellow" indicator 128 through contacts 156, 160 on the relay 136 and through contacts 162, 164 on the relay 138. Therefore, when the subject count is completed in the example given, the yellow indicator 128 would be energized, indicating that the ratio between "subject plus background" and "background" counts is at least two to one, but less than five to one.

If the subject count had been "fifteen" in the foregoing example, the sequence just described would occur, with these additional steps. As the movable background contact 124 reached its associated fixed contact 15d, a circuit would be completed through the background relay middle deck contacts 3b and 50 to the winding 142 of the relay 138. This would energize the relay 138, completing a holding circuit through contacts 166, 168 thereof. Also, the circuit through the contacts 162, 164 to the "yellow" indicator 128 would open, and a circuit would be completed to the "red" indicator 130 through contacts 162, 170 on the relay 138. Of course, if the subject count had been higher than fifteen, the holding circuit for the relay 138 would have insured continued energization of the red indicator 130.

After a subject has been surveyed, the switch 113 is opened (preferably, automatically, as the subject moves out of "survey" position). This will deenergize the third timer control relay 82, establishing a homing circuit for the subject count relay 40 through a pair of contacts 172, 174 on the timer control relay 82. This circuit extends from the voltage source 24 through contacts 106, 107 on the counter output control relay 102 and through the contacts 172, 174 to the movable upper deck contact 122 of the subject count relay 40. The homing action of the subject count relay 40 will be similar to that previously described for the background relay 38, leaving both movable contacts 122, 124 in the zero position.

When the switch 113 is closed for the next subject survey, the temporary energization of the first timer control relay 78 will open the holding circuits of the indicator control relays 136, 138, thereby preparing the indicators 126, 128, 130 for proper operation.

It can be seen that the present invention provides a convenient survey system especially adapted for use in rapidly surveying a large number of untrained personnel, since it is unnecessary for the subject to make any calculations or consider any numerical ratios. The fixed contact decks 44, 46, 124 can be equipped with so-called "pin jack" connections, making it a simple matter to change the count ratios whenever necessary. Once the background count has been determined, the apparatus can be operated without supervision until changes in conditions make it necessary to recalibrate. "Fail-safe" circuits can readily be incorporated, if desired, so that a failure of power at any point will immediately be manifested by a total lack of count indications.

Since many changes could be made in the specific apparatus shown and described, all within the scope and spirit of the invention, the foregoing is to be construed as illustrative, and not in a limiting sense.

1. A radioactivity survey apparatus comprising a radiation detector, first and second relays each having an operating winding and a set of fixed contacts, a movable contact for each said fixed contact set and adapted to be moved sequentially from one to another of the associated fixed contacts in response to energization of the associated relay winding, means selectively to energize either of said operating windings in response to detection of a predetermined number of rays by said detector, means connecting preselected ones of said fixed contacts in one set to preselected ones of said fixed contacts in the other set, an indicator, and means connected to actuate said indicator in response to movement of said movable contacts to connected ones of said fixed contacts.

2. A radioactivity survey apparatus comprising a radiation detector, first and second relays each having an operating winding, said first relay having at least one set of fixed contacts and said second relay having at least two sets of fixed contacts, a movable contact for each said fixed contact set and adapted to be moved sequentially from one to another of the associated fixed contacts in response to energization of the associated relay winding, means selectively to energize either of said operating windings in response to detection of a predetermined number of rays by said detector, means connecting preselected ones of said fixed contacts in said one set to preselected ones of said fixed contacts in said two sets, a plurality of indicators, and means connected to actuate one of said indicators in response to movement of said movable contacts to connected ones of said fixed contacts in two of said sets and to actuate another of said indicators in response to movement of said movable contacts to connected ones of said fixed contacts in a different two of said sets.

3. In a radioactivity survey apparatus, in combination, a radiation detector, first and second sets of fixed contacts, a movable contact associated with each said set, means selectively to move either of said movable contacts sequentially from one to another of the fixed contacts in the set associated therewith in reponse to detection of a predetermined number of rays by said detector, connections from preselected ones of the fixed contacts in one of said sets to preselected ones of the fixed contacts in the other of said sets, an indicator, means to actuate said indicator, and means connected to said movable contacts and responsive to movement of said movable contacts to connected ones of said fixed contacts for operating said actuating means.

4. A radioactivity survey apparatus comprising a radiation detector, first and second relays each having an operating winding, each said relay having a set of multiple fixed contacts, a movable contact for each said fixed contact set and adapted to be moved sequentially from one to another of its associated fixed contacts in response to energization of its associated relay winding, a third relay having an operating winding and having a pair of contacts adapted to be closed upon energization of said last-named winding, means connecting said last named winding to said detector for energization of said last named winding in response to detection of a predetermined number of rays by said detector, means to energize either said first or said second relay winding in response to closing of said pair of contacts, connections from preselected ones of the fixed contacts in one of said contact sets to preselected ones of said fixed contacts in the other of said sets, an indicator, and means to actuate said indicator in response to movement of said movable contacts to connected ones of said fixed contacts in sets.

5. A radioactivity survey apparatus comprising a radiation detector, first and second relays each having an operating winding, said first relay having at least one set of multiple fixed contacts and said second relay having at least two sets of multiple fixed contacts, a movable contact for each said fixed contact set and adapted to be moved sequentially from one to another of its associated fixed contacts in response to energization of its associated relay winding, means connected to said detector to selectively energize either said first or said second relay winding in response to detection of a predetermined number of rays by said detector, connections from preselected ones of the fixed contacts in both said two sets, a plurality of indicators, means to actuate one of said indicators in response to movement of said movable contacts to connected ones of said fixed contacts in one pair of said sets, and means to actuate another of said indicators in response to movement of said movable contacts to connected ones of said fixed contacts in another pair of said sets.

6. A radioactivity survey apparatus comprising a radiation detector, first and second relays each having an operating winding, each said relay having a set of multiple fixed contacts, a movable contact for each said fixed contact set and adapted to be moved sequentially from one to another of its associated fixed contacts in response to energization of its associated relay windings, a circuit for selectively energizing either said first or said second relay winding in response to detection of a predetermined number of rays by said detector, means to close said energizing circuit for preselected time intervals, connections from preselected ones of the fixed contacts in one of said contact sets to preselected ones of said fixed contacts in the other of said sets, an indicator, and means to actuate said indicator in response to movement of said movable contacts to connected ones of said fixed contacts.

7. A radioactivity survey apparatus comprising a radiation detector, first and second relays each having an operating winding, said first relay having at least one set of multiple fixed contacts and said second relay having at least two sets of multiple fixed contacts, a movable contact for each said fixed contact set and adapted to be moved sequentially from one to another of its associated fixed contacts in response to energization of its associated relay winding, a third relay having an operating winding connected to said detector and having a pair of contacts adapted to be closed upon energization of said last-named winding, a selector switch, a circuit for energizing either said first or said second relay winding and including said pair of contacts and said selector switch, means to close said energizing circuit for preselected time intervals, connections from preselected ones of the fixed contacts in one of said contact sets to preselected ones of said fixed contacts in both said two sets, a plurality of indicators, means to actuate one of said indicators in response to movement of said movable contacts to connected ones of said fixed contacts in one pair of said sets, and means to actuate another of said indicators in response to movement of said movable contacts to connected ones of said fixed contacts of another pair of said sets.

SAMUEL M. ZOLLERS.

REFERENCES CITED

The following references are of record in the file of this patent:

UNITED STATES PATENTS

| Number | Name | Date |
|---|---|---|
| 2,019,863 | Kolm | Nov. 5, 1935 |
| 2,532,503 | Kennedy et al. | Dec. 5, 1950 |

OTHER REFERENCES

A Direct-Reading Rate Ratio Meter, Evans et al. Rev. of Sci. Instruments, Nov. 1939, vol. 10, pages 339, 344.